United States Patent [19]

Hino

[11] Patent Number: 4,516,846
[45] Date of Patent: May 14, 1985

[54] RECORDING ERROR-PREVENTION SYSTEM

[75] Inventor: Hiromasa Hino, Kanagawa, Japan

[73] Assignee: Fuji Photo Film Co., Ltd., Kanagawa, Japan

[21] Appl. No.: 519,669

[22] Filed: Aug. 2, 1983

[30] Foreign Application Priority Data

Aug. 10, 1982 [JP] Japan .............................. 57-137855

[51] Int. Cl.³ ............................................. G03B 17/18
[52] U.S. Cl. .................................. 354/465; 354/467; 354/486
[58] Field of Search ............... 354/465, 467, 486, 266, 354/268; 352/174, 178

[56] References Cited

U.S. PATENT DOCUMENTS 4,125,850 11/1978 Fujita et al. ......................... 354/268
4,348,096 9/1982 Katsuma et al. ................. 354/289.1
4,375,914 3/1983 Miller ............................... 354/289.1

Primary Examiner—Russell E. Adams

[57] ABSTRACT

A recording error-prevention system in which an abnormal position of a camera set in a continuous-recording mode of operation, relative to the horizontal position, is detected by a position-sensing device and an alarm is given by an alarm device on the condition of this detection and, if the alarm is not cleared for a predetermined period of time, recording is stopped by an auto-stop device.

12 Claims, 6 Drawing Figures

4,516,846

RECORDING ERROR-PREVENTION SYSTEM

BACKGROUND OF THE INVENTION

The present invention relates to a recording error-prevention system for preventing a recording error of a portable VTR camera, and 8 mm camera and so forth.

In general, a portable VTR camera or 8 mm camera is designed so that a recording button, serving as a recording switch, is locked by manually depressing it, thereby holding the button in an automatic locked position for recording until it is depressed again. Depressing the button again will release the recording button from the locked position, and thus stop the recording by returning the button to its initial position. In case the recording button is left locked, unnecessary pictures are recorded, resulting in a waste of video tape or film and battery power.

SUMMARY OF THE INVENTION

It is therefore an object of the present invention to provide a recording error-prevention system which ensures the prevention of the above-said recording error such as encountered in a camera of the type that is set in a continuous-recording mode of operation upon turning the recording switch to ON.

In accordance with an aspect of the present invention, the recording error-prevention system is comprised of a position-sensing device for sensing an abnormal position of the camera relative to its horizontal position for ordinary recording and an alarm device for sounding an alarm under the conditions that the recording switch is in the ON state and that the abnormal position of the camera is sensed by the position-sensing device.

In accordance with another aspect of the present invention, the recording error-prevention system is comprised of a position-sensing device for sensing an abnormal position of the camera relative to its horizontal position for ordinary recording, an alarm device for sounding an alarm under the conditions that the recording switch is in the ON state and that the abnormal position of the camera is sensed by the position-sensing device, and an auto-stop device to stop recording if the alarm is not cleared for a predetermined period of time.

DESCRIPTION OF THE PREFERRED EMBODIMENT

Figure 1:
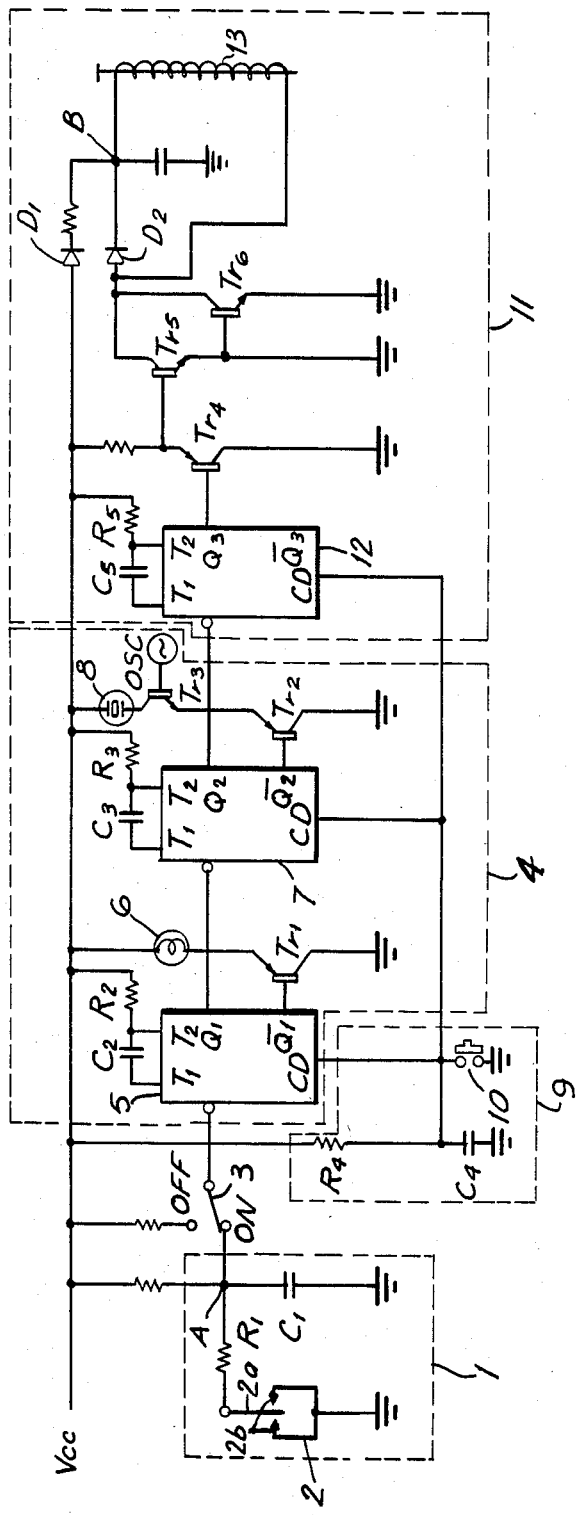
FIG. 1 is a circuit diagram illustrating an embodiment of the present invention.
Figure 2:
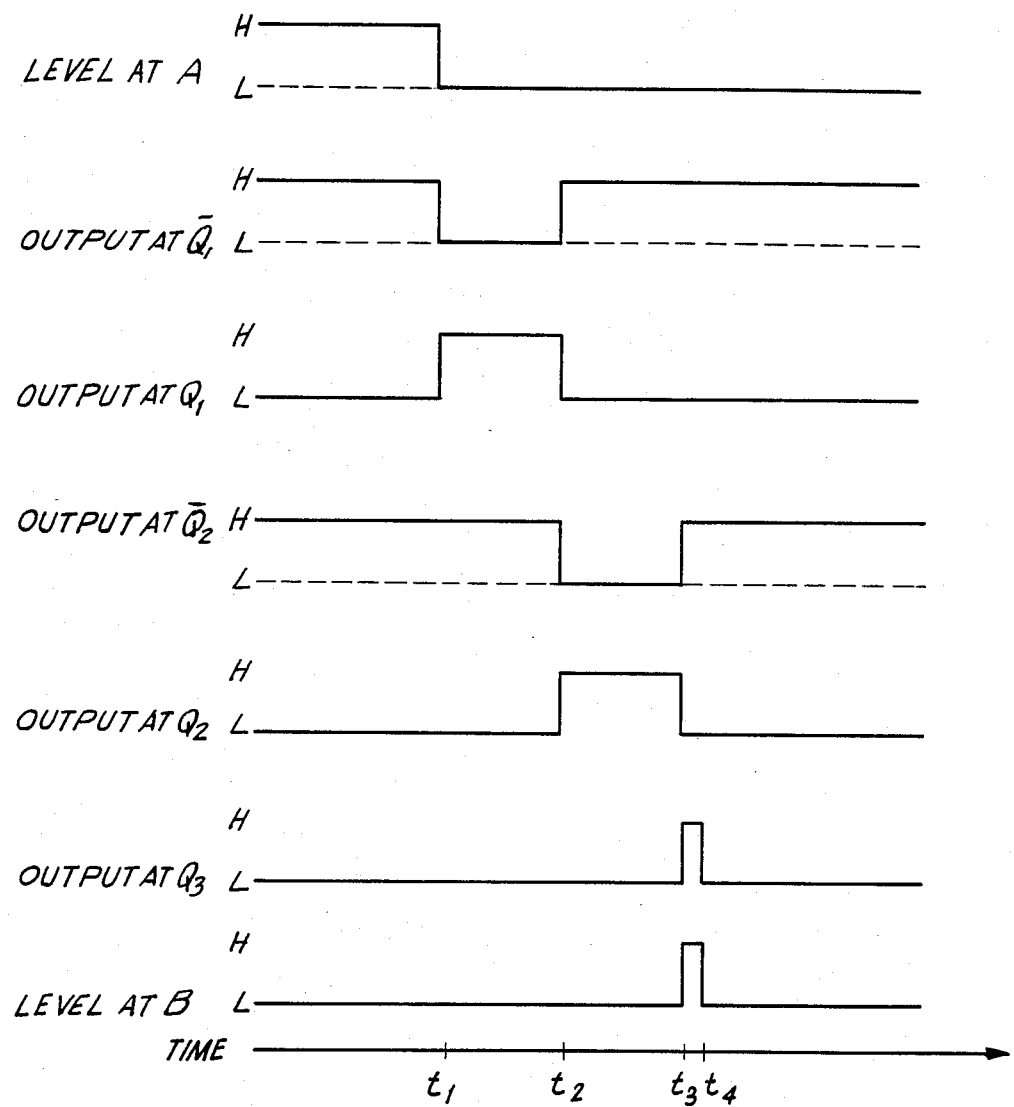
FIG. 2 is a diagram explanatory of its operation.

Referring first to FIGS. 1 and 2, an embodiment of the present invention will be described in detail.

The position-sensing device 1 is comprised of a position sensor 2, a resistor $R_1$ and a capacitor $C_1$. The position sensor 2 is made up of a movable contact 2a and a fixed contact 2b. When the camera is held substantially in the horizontal position, the movable contact 2a and the fixed contact 2b are out of contact with each other to retain the position sensor 2 in the OFF state; but when the camera gets out of the horizontal position, the movable contact 2a and the fixed contact 2b come into contact with each other to turn the position sensor 2 to ON. The resistor $R_1$ and the capacitor $C_1$ prevent an adverse effect of chattering of the position sensor 2. Various specific examples of the position-sensing device will be described later in respect to FIGS. 3 to 6.

The recording switch 3, when turned to ON, connects the position-sensing device 1 to the alarm 4 provided in the following stage and, at the same time, permits recording through a circuit arrangement not shown. When the recording switch 3 is turned to OFF, the recording error-prevention system will not operate.

The alarm device 4 is comprised of two alarms, the first of which is alarm made up of a monostable multivibrator 5 having a resistor $R_2$ and a capacitor $C_2$, a lamp 6 and a transistor $Tr_1$; and a second alarm made up of a monostable multivibrator 7 having a resistor $R_3$ and a capacitor $C_3$, a piezoelectric buzzer 8, transistors $Tr_2$ and $Tr_3$ and an oscillator OSC. In the event that the camera gets out of its normal or horizontal position and turns on the position sensor 2 when the recording switch 3 is held on the ON position, the potential at point A drops from its high level to a low one (at the time $t_1$ in FIG. 2). As a result of this, a negative pulse is provided to the monostable multivibrator 5 to make the output at its terminal $\overline{Q}_1$ low-level, thus permitting the transistor $Tr_1$ to conduct the current to light a lamp 6. Since the lamp 6 is provided in the viewfinder, the cameraman, who is looking into the viewfinder during recording, can observe the light of the lamp 6 indicating the abnormal position of the camera. The lighting time of the lamp 6 is equal to the time $(t_2-t_1)$ during which the output at the terminal $\overline{Q}_1$ remains low-level. This time is dependent on the time constant based on the values of the resistors $R_2$ and the capacitor $C_2$.

On the other hand, for shooting scenes in the sky or on the ground, the camera is tilted out of its normal horizontal position and, accordingly, the lamp 6 is lighten; but if it is desired to keep on shooting, the lamp 6 can be put out by depressing the reset button 10 of a reset device 9. That is to say, upon depression of the reset button 10, the monostable multivibrator 5 is reset to put out the lamp 6. This reset state is maintained for a period of time that depends on a time constant based on the values of a resistor $R_4$ and a capacitor $C_4$ incorporated in the reset device 9.

Moreover, in the case where the lighting of the lamp 6 goes unnoticed, or where the reset button was pressed once but the lamp 6 is lighted again and is kept on, the output at the terminal $\overline{Q}_1$ becomes high-level (at the time $t_2$ in FIG. 2), turning off the lamp 6. Upon turning off the lamp 6, the output at the terminal $\overline{Q}_1$ which has been high-level becomes low-level. In consequence, a negative pulse is applied to the monostable multivibrator 7 to make the output at its terminal $\overline{Q}_2$ low-level. Accordingly, the transistor $Tr_2$ conducts and an oscillation current flows from the oscillator OSC via the transistor $Tr_3$ to the piezoelectric buzzer 8 to energize it. The time during which the buzzer 8 rings is the time $(t_3-t_2)$ that is determined by a time constant based on the values of the resistor $R_3$ and the capacitor $C_3$. By manually turning the recording switch 3 to OFF when the piezoelectric buzzer 8 rings, a recording error can be stopped. If it is desired to keep on shooting, it is sufficient only to depress the reset button 10, by which the monostable multivibrator 7 is reset to stop the piezoelectric buzzer 9 from ringing.

An auto-stop device 11 is comprised of a monostable multivibrator 12 having a resistor $R_5$ and a capacitor $C_5$, transistor $Tr_4$, $Tr_5$ and $Tr_6$, reverse voltage-blocking diodes $D_1$ and $D_2$ and a stop-solenoid 13. When the monostable multivibrator 12 remains stable, the transistor $Tr_4$ is conductive and the transistors $Tr_5$ and $Tr_6$ are nonconductive, causing no current flow to the solenoid 13.

The auto-stop device 11 of such an arrangement operates in the following manner. In the case where the camera is left alone in spite of the ringing of the piezoelectric buzzer 8, the buzzer 8 stops ringing at the time $t_3$. At the same time, the output of the monostable multivibrator 7 at its terminal $Q_2$ becomes low-level and a negative pulse is provided to the monostable multivibrator 12 to make it metastable, producing a pulse at its terminal $Q_3$. In the period of time $(t_4-t_3)$ corresponding to the pulse width, the transistor $Tr_4$ becomes nonconductive and the transistors $Tr_5$ and $Tr_6$ become conductive and, in consequence, the potential at point B rises in a pulse-wise manner and a pulse current flows in the stop-solenoid 13. When supplied with the pulse current, the stop-solenoid 13 connects the recording switch 3 to the OFF state, stopping the recording operation.

As described above, according to this embodiment, when the camera is turned upside down or held sideways in spite of it being intentionally or unintentionally held operative, the lamp 6 is lighted first and then the piezoelectric buzzer 8 is driven to ring and finally the stop-solenoid 13 is energized to stop the recording operation. It is a matter of course that if the reset button 10 is pressed when the alarm is raised, the alarm is cleared and the recording can be continued even if the camera is held in an abnormal position. While the present invention has been described as being applied to the camera of the type in which the recording switch 3 is locked, it is needless to say that the invention is similarly applicable to a camera of the type in which locking is not ganged with the recording switch, or of the type employing a recording switch which is not locked.

Next, a description will be given, with FIGS. 3 to 6, of various specific examples of the position-sensing device.

Figure 3:
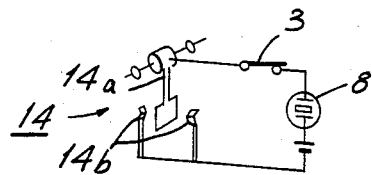
FIGS. 3 to 5 are schematic diagrams showing various specific examples of the position-sensing device.

The position-sensing device 14 shown in FIG. 3 is formed by a metal piece 14a pivotally supported at its upper end and a pair of contacts 14b, the lower end of the metal piece 14a assuming a position between the contacts 14b. Accordingly when the camera is tilted or turned upside down, the metal piece 14a rocks into contact with one of the contacts 14b to cause current flow, detecting the abnormal position of the camera.

Figure 4:
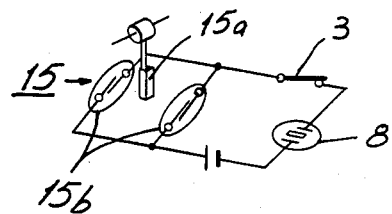

A position-sensing device 15 shown in FIG. 4 is comprised of a magnet 15a pivotally supported at its upper end, and a pair of reed relays 15b which make when exposed to a magnetic field. With such an arrangement, when the camera is brought into an abnormal position, the magnet 15a rocks to approach one of the reed relays 15b to close it. By the closure of the reed relay 15b, current starts to flow to detect the abnormal position of the camera.

Figure 5:
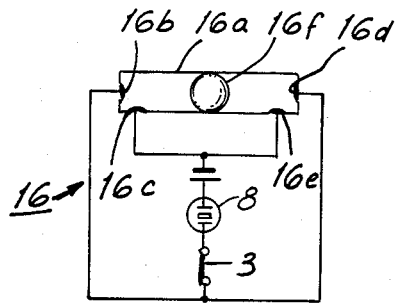

The position-sensing device 16 shown in FIG. 5 is made up of a tubular member of envelope 16a made of an insulator and having a pair of contacts 16b and 16c and another pair of contacts 16d and 16e at both ends thereof; and a conductive spherical member 16f provided in the tubular member 16a. With this structure, when the camera assumes an abnormal position, the spherical member 16f rolls to one end of the tubular member 16a to make contact with both of the contacts 16b and 16c or 16d and 16e, electrically connecting them. Thus current flows to detect the abnormal position of the camera.

Figure 6:
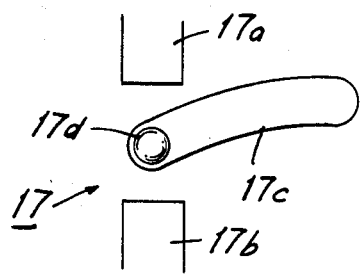

The position-sensing device 17 shown in FIG. 6 is comprised of a light-emitting element 17a, a photo detector 17b and a transparent and curved tubular member or envelope 17c having incorporated therein a black-colored light-shielding spherical member 17d. The tubular member 17c is installed so that when the camera is held in the horizontal position, the spherical member 17d will lie in an intermediate position between the light-emitting element 17a and the photo detector 17b. Accordingly, when the camera is held in the normal position, light emitted from the light-emitting element 17a is intercepted by the spherical member 17d, whereas when the camera is in an abnormal position, the spherical member 17d rolls to permit the reception of light from the light-emitting element 17a by the photo detector 17b, thus detecting the abnormal position of the camera.

The position-sensing device is not limited specifically to those described above but may also utilize any means so long as they are able to detect the abnormal position of the camera.

As has been described above, according to the present invention, when the camera assumes an abnormal position during recording, an alarm is raised or the recording operation is stopped, so that a recording error can be prevented with certainty.

What is claimed is:

1. A recording error-prevention system for a camera of the type that is set in a continous-recording mode of operation upon turning to ON a recording switch, comprising:

a position-sensing device for sensing an abnormal position of the camera relative to its horizontal position for ordinary recording; and
   an alarm device for raising an alarm under the conditions that the recording switch is in the ON state and that the abnormal position of the camera is sensed by the position-sensing device.

2. A recording error-prevention system according to claim 1, wherein the alarm device is comprised of a monostable multivibrator which produces a square pulse when supplied with a trigger pulse; a transistor which conducts the current when supplied with the square pulse from the monostable multivibrator; and a lamp which is connected to the transistor and energized by the current which is conducted by the transistor.

3. A recording error-prevention system according to claim 1, wherein the alarm device is comprised of a first monostable multivibrator which produces a square pulse when supplied with a trigger pulse, a first transistor which conducts the current when supplied with the square pulse from the monostable multivibrator, a lamp which is connected to the first transistor and energized by the conduction of the first transistor, a second monostable multivibrator which produces a square pulse when supplied with a trigger pulse generated by a change of the first monostable multivibrator from its metastable state to a stable one, a second transistor which conducts the current when supplied with the square pulse from the second monostable multivibrator; and a piezoelectric buzzer which is connected to the second transistor and energized by the conduction thereof.

4. A recording error-prevention system according to claim 2, wherein the monostable multivibrator, when reset, becomes stable regardless of whether or not it is supplied with the trigger pulse.

5. A recording error-prevention system according to claim 3, wherein the first and second monostable multivibrators, when reset, become stable regardless of whether or not they are supplied with the trigger pulses.

6. A recording error-prevention system according to claim 1, wherein the position sensing device is comprised of a pair of fixed contacts disposed apart, and a metallic piece pivotally supported at its upper end and having its lower end lying between the pair of contacts for making contact with one of them when rocked.

7. A recording error-prevention system according to claim 1, wherein the position-sensing device is comprised of a pair of reed relays closing under action of a magnetic field and a magnet pivotally supported at its upper end which, when rocked, approaches one of the reed relays to close it.

8. A recording error-prevention system according to claim 1, wherein the position-sensing device is comprised of a tubular member formed of an insulator and having a pair of contacts at either end thereof, and a conductive spherical member disposed in the tubular member which, when the tubular member is tilted, rolls down into contact with the pair of contacts at the lower end of the tubular member.

9. A recording error-prevention system according to claim 1, wherein the position-sensing device is comprised of a light-emitting element, a photo detector, and a transparent, curved tubular member having incorporated therein a spherical member for intercepting light and disposed so that when the camera is held in the horizontal position, the spherical member lies between the light-emitting element and the photo detector.

10. A recording error-prevention system for a camera of the type that is set in a continous-recording mode of operation upon turning to ON a recording switch, comprising:

a position-sensing device for sensing an abnormal position of the camera relative to its horizontal position for ordinary recording:

an alarm device for raising an alarm under the conditions that the recording switch is in the ON position and that the abnormal position of the camera is revealed by the position-sensing device; and an auto-stop device for stopping recording if the alarm is not cleared for a predetermined period of time.

11. A recording error-prevention system according to claim 10, wherein the auto-stop device is comprised of a monostable multivibrator which produces a square pulse when supplied with a trigger pulse from the alarm device, a transistor which is controlled by the square pulse from the monostable multivibrator, and a stop-solenoid which, upon generation of the square pulse, is energized via the transistor to turn off the recording switch.

12. A recording error-prevention system according to claim 11, wherein the alarm device is comprised of a first monostable multivibrator which produces a square pulse when supplied with a trigger pulse, a first transistor which conducts current when supplied with the square pulse from the monostable multivibrator, a lamp which is connected to the first transistor and energized by the conduction of the first transistor, a second monostable multivibrator which produces a square pulse when supplied with a trigger pulse generated by a change of the first monostable multivibrator from its metastable state to a stable one, a second transistor which conducts the current when supplied with the square pulse from the second monostable multivibrator, and a piezoelectric buzzer which is connected to the second transistor and energized by the condition thereof, and said first and second monostable multivibrators of the alarm device and the monostable multivibrator of the auto-stop device, when reset, become stable regardless of whether or not they are supplied with the trigger pulses.

* * * * *